United States Patent
Park (10) Patent No.: US 9,978,525 B2
(45) Date of Patent: May 22, 2018

(54) MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventor: Heung Kil Park, Suwon-Si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 42 days.

(21) Appl. No.: 14/861,611

(22) Filed: Sep. 22, 2015

(65) Prior Publication Data

US 2016/0211078 A1 Jul. 21, 2016

(30) Foreign Application Priority Data

Jan. 20, 2015 (KR) .................. 10-2015-0009324

(51) Int. Cl.
| | |
|---|---|
| *H01G 4/38* | (2006.01) |
| *H01G 2/02* | (2006.01) |
| *H01G 2/10* | (2006.01) |
| *H01G 4/232* | (2006.01) |

(52) U.S. Cl.
CPC .............. *H01G 4/38* (2013.01); *H01G 2/02* (2013.01); *H01G 2/103* (2013.01); *H01G 4/232* (2013.01)

(58) Field of Classification Search
CPC ............ H01G 4/005; H01G 4/38; H01G 4/40; H01G 4/012; H01G 4/12; H01G 4/30; H01G 4/32
See application file for complete search history.

(56) References Cited

U.S. PATENT DOCUMENTS

| | | | | |
|---|---|---|---|---|
| 6,515,844 | B1* | 2/2003 | Moriwaki | H01C 1/028 361/301.4 |
| 7,057,878 | B2 | 6/2006 | Vierow et al. | |
| 7,848,079 | B1* | 12/2010 | Gordin | H01G 4/38 361/328 |
| 8,873,219 | B2* | 10/2014 | Perea | H01C 1/14 361/301.4 |
| 9,842,699 | B2* | 12/2017 | Park | H01G 4/30 |
| 2006/0104006 | A1* | 5/2006 | Saito | H01G 2/04 361/301.3 |
| 2006/0198079 | A1 | 9/2006 | Shim et al. | |
| 2007/0253146 | A1* | 11/2007 | Inoue | H01G 2/04 361/328 |
| 2014/0038454 | A1* | 2/2014 | Sugaya | H01R 13/2421 439/540.1 |

FOREIGN PATENT DOCUMENTS

| | | |
|---|---|---|
| JP | 2011-40684 A | 2/2011 |
| KR | 10-2006-0098771 A | 9/2006 |

* cited by examiner

*Primary Examiner* — Nguyen Ha
(74) *Attorney, Agent, or Firm* — McDermott Will & Emery LLP (57) ABSTRACT

A multilayer ceramic electronic component includes: a capacitor set including a plurality of multilayer ceramic capacitors connected in series and accommodated in an insulation case while exposing external electrodes provided on both end portions thereof; and a pair of metal terminals connected to the external electrodes exposed outside of the insulation case, respectively. One end portion of the capacitor set is elastically supported by one of the pair of metal terminals.

19 Claims, 5 Drawing Sheets

MULTILAYER CERAMIC ELECTRONIC COMPONENT

CROSS-REFERENCE TO RELATED APPLICATION

This application claims the priority and benefit of Korean Patent Application No. 10-2015-0009324 filed on Jan. 20, 2015, with the Korean Intellectual Property Office, the disclosure of which is incorporated herein by reference.

BACKGROUND

The present disclosure relates to a multilayer ceramic electronic component.

A multilayer ceramic capacitor, a multilayer electronic component, is a capacitor mounted on a printed circuit board of various electronic products such as display devices including a liquid crystal display (LCD), a plasma display panel (PDP), and the like, computers, personal digital assistants (PDAs), and mobile phones to thereby serve to charge or discharge electricity.

The above-mentioned multilayer ceramic capacitor (MLCC) may be used as a component of various electronic devices due to advantages such as a small size, high capacitance, and ease of mounting.

Recently, as electronic control of automotive vehicles has been developed, the number of electrical control units (ECU) mounted within vehicles has significantly increased. ECUs are used in an environment in which temperature change is large and vibrations and impacts are applied thereto over a long period of time.

Therefore, in multilayer ceramic electronic components used in industry/electric fields such as ECUs, high durability and reliability against thermal stress and mechanical stress have been required.

According to the related art, a metal frame has been used as a method for satisfying high reliability. However, in a case in which a metal frame is used, product costs may be rapidly increased, and there has been a limitation in connecting a plurality of multilayer ceramic capacitors to modularize the multilayer ceramic capacitors.

SUMMARY

An aspect of the present disclosure may provide a multilayer ceramic electronic component capable of having high durability and high reliability against thermal stress and mechanical stress.

According to an aspect of the present disclosure, a multilayer ceramic electronic component may include: a capacitor set including a plurality of multilayer ceramic capacitors connected in series and accommodated in an insulation case while exposing external electrodes provided on opposite end portions thereof; and a pair of metal terminals connected to the external electrodes exposed outside of the insulation case, respectively. One end portion of the capacitor set may be elastically supported by one of the pair of metal terminals.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions will be defined in order to clearly describe exemplary embodiments. "L," "W," and "T" illustrated in FIG. 4 refer to a length direction, a width direction, and a thickness direction, respectively. Here, the length direction may be the same as a direction in which internal electrodes are exposed to opposite surfaces of a ceramic body. The internal electrodes may be stacked in the width direction, and alternatively, may be stacked in the thickness direction.

Further, in the present exemplary embodiment, for convenience of explanation, surfaces of a ceramic body opposing each other in the thickness direction are defined as upper and lower main surfaces or upper and lower surfaces, and the lower surface is defined as a mounting surface.

Multilayer Ceramic Electronic Component

A multilayer ceramic electronic component, according to an exemplary embodiment, may include a capacitor set including a plurality of multilayer ceramic capacitors connected in series and accommodated in an insulation case while exposing external electrodes provided on both end portions thereof; and a pair of metal terminals connected to the external electrodes exposed outside of the insulation case, respectively. One end portion of the capacitor set may be elastically supported by one of the pair of metal terminals.

In addition, the insulation case may have at least one through hole to accommodate the capacitor set therein.

Further, at least two capacitor sets may be accommodated in the insulation case while being spaced apart from each other and being parallel to or perpendicular to each other.

In addition, each of the metal terminals may include a guide portion supporting upper and lower surfaces of the insulation case; and a fixing portion fixed to a surface of the insulation case.

Here, a fixing protrusion is provided at a distal end of the fixing portion, and a fixing groove may be formed in the surface of the insulation case to correspond to the fixing protrusion.

Figure 1:
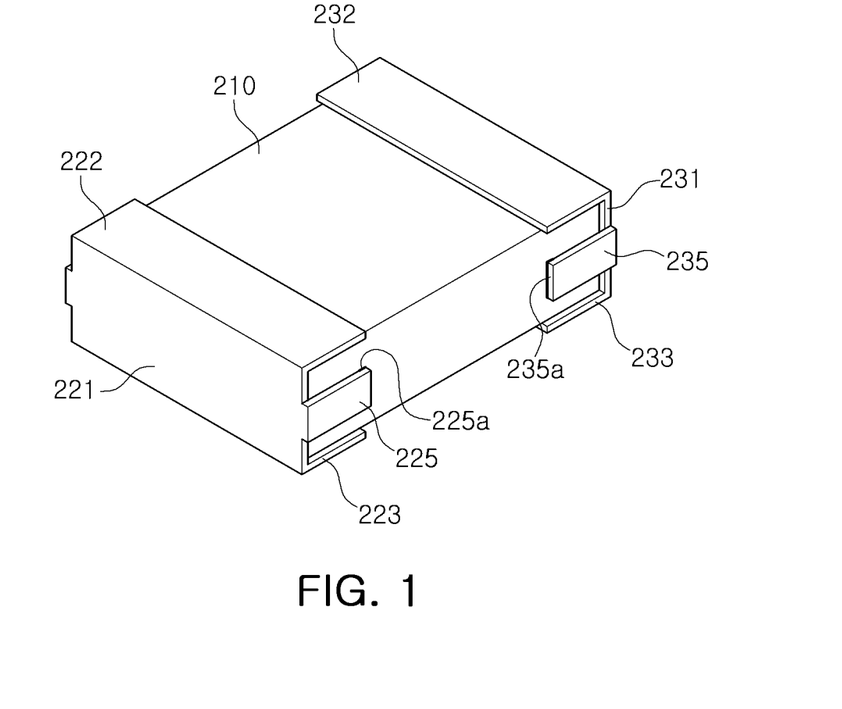
FIG. 1 is a perspective view schematically illustrating a multilayer ceramic electronic component according to an exemplary embodiment in the present disclosure.
Figure 2:
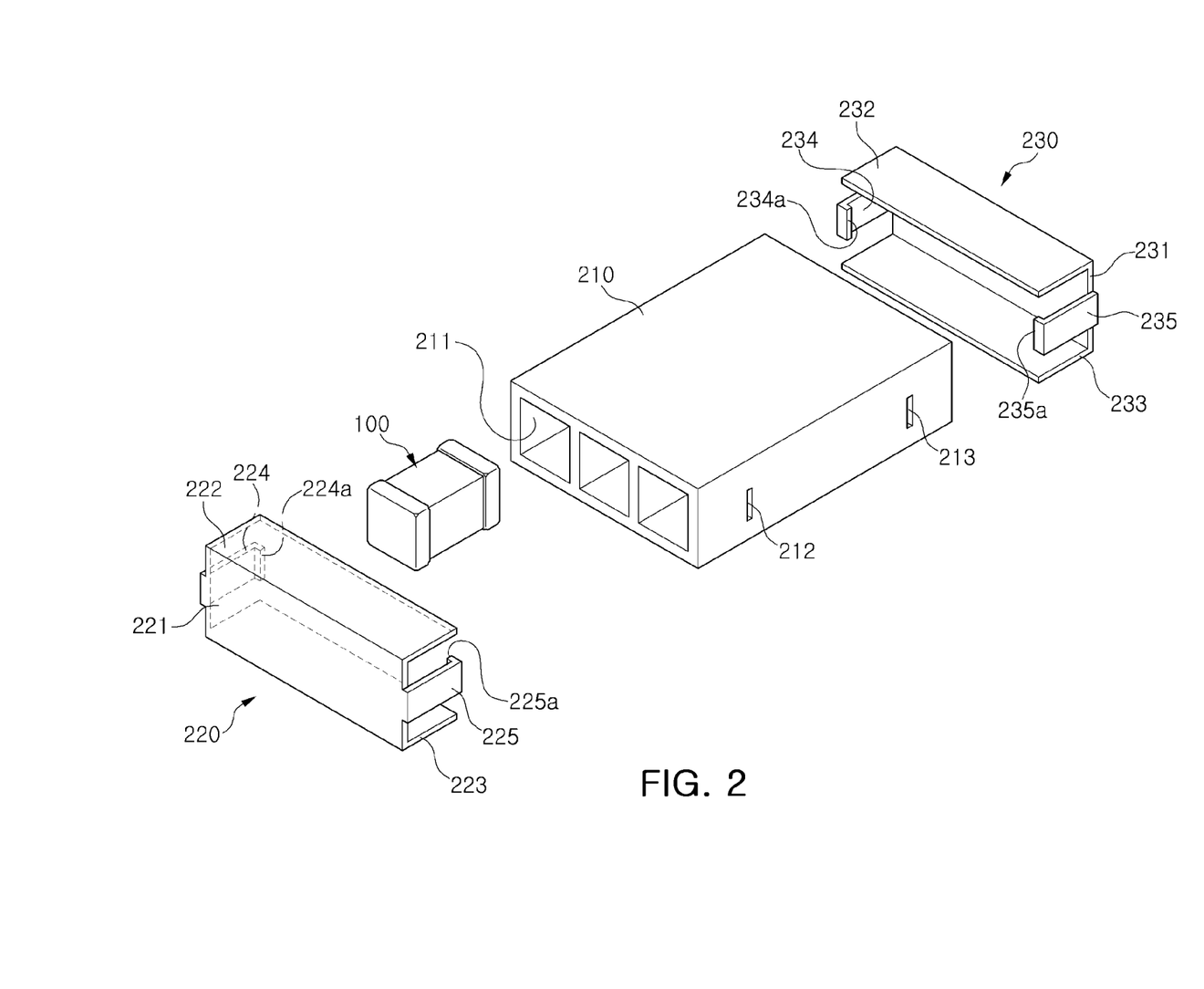
FIG. 2 is an exploded perspective view of the multilayer ceramic electronic component of FIG. 1.
Figure 3:
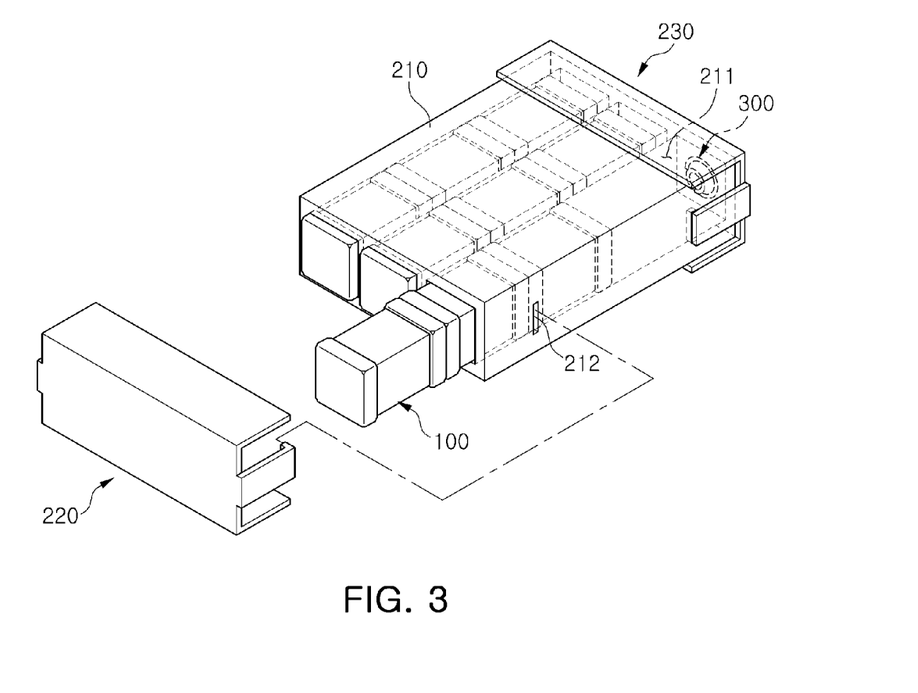
FIG. 3 is an exploded perspective view of a first metal terminal and a case of FIG. 1.
Figure 4:
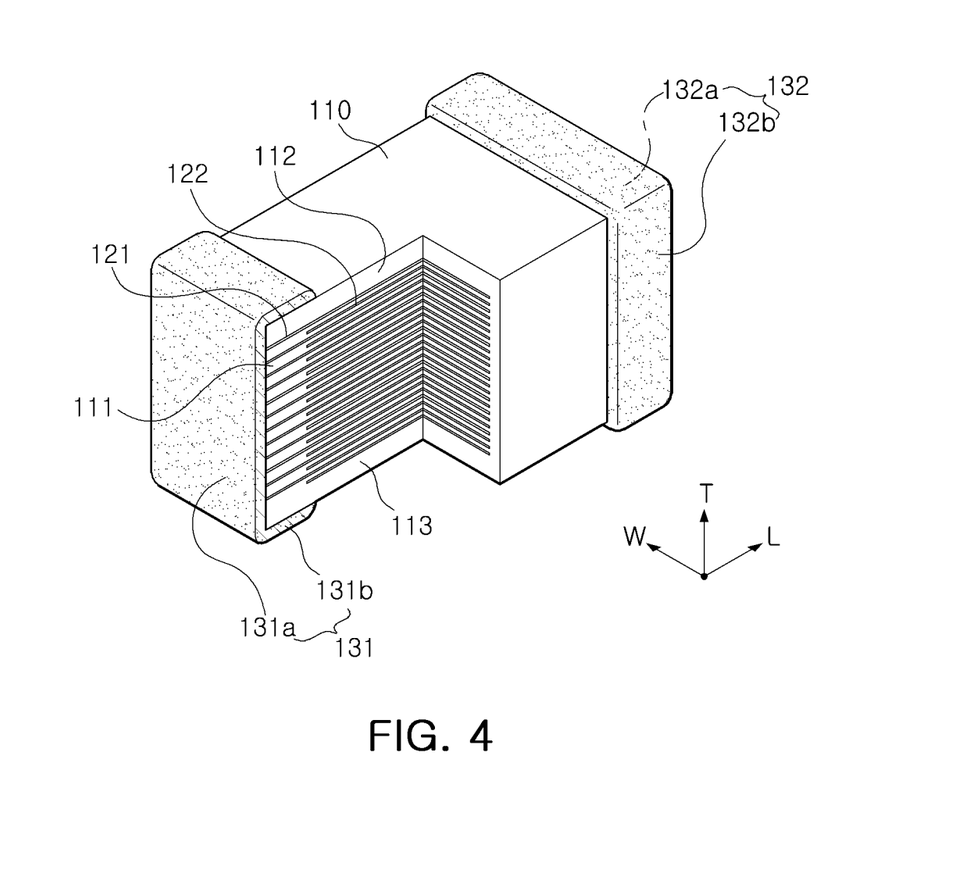
FIG. 4 is a partially cut-away perspective view of a multilayer ceramic capacitor used in a multilayer ceramic electronic component according to an exemplary embodiment in the present disclosure.

FIG. 1 is a perspective view schematically illustrating the multilayer ceramic electronic component according to the exemplary embodiment, FIG. 2 is an exploded perspective view of the multilayer ceramic electronic component of FIG. 1, FIG. 3 is an exploded perspective view of a first metal terminal and a case of FIG. 1, and FIG. 4 is a partially cut-away perspective view of a multilayer ceramic capacitor used in the multilayer ceramic electronic component according to the exemplary embodiment.

Referring to FIGS. 1 through 4, the multilayer ceramic electronic component, according to the exemplary embodiment, may include an insulation case 210, a plurality of multilayer ceramic capacitors 100; first and second metal terminals 220 and 230, and an elastic support member.

In this case, at least two multilayer ceramic capacitors 100 may be connected in series, thereby forming a single capacitor set.

Further, the elastic support member, which serves to allow one end portion of the capacitor set to be supported by the first or second metal terminal 220 or 230, may be composed of, for example, a compression spring 300, or the like.

The insulation case 210, which is, for example, a hexahedron formed to be elongated in the length direction, may be formed of an insulation material.

A plurality of through holes 211 of which opposite ends are open may be formed in the insulation case 210 in the length direction.

The through holes 211 may be formed, for example, in a square column shape corresponding to the multilayer ceramic capacitor 100 and may be spaces in which the capacitor set is accommodated so that opposite end portions are exposed.

At least two through holes 211 as described above may be formed to be spaced apart from each other in a width or height direction of the insulation case 210.

For example, although a case in which the number of through holes 211 arranged in the width direction is three and the through holes 211 are arranged in a row in the height direction is illustrated and described in the present exemplary embodiment, the number and arrangement of through holes are not limited thereto. For example, the number of through holes 211 arranged in the width direction may be two or four or more, and the through holes 211 may be arranged in two rows or more in the height direction.

Meanwhile, first and second fixing grooves 212 and 213 may be formed in both side surfaces of the insulation case 210 in the width direction so that first and second fixing protrusions of the first and second metal terminals 220 and 230 may be fixed thereto.

Referring to FIG. 4, the multilayer ceramic capacitor 100, according to the present exemplary embodiment, may include a ceramic body 110, first and second internal electrodes 121 and 122, and first and second external electrodes 131 and 132.

The ceramic body 110 may be formed by stacking a plurality of dielectric layers 111 and sintering the stacked dielectric layers 111. In this case, a shape and dimension of the ceramic body 110 and the number of stacked dielectric layers 111 may be variously changed and are not limited to those of the present exemplary embodiment illustrated in FIG. 4.

In addition, the plurality of dielectric layers 111 configuring the ceramic body 110 may be in a sintered state, and adjacent dielectric layers 111 may be integrated with each other so that boundaries therebetween are not readily apparent without a scanning electron microscope (SEM).

In addition, the ceramic body 110 may include an active part contributing to forming capacitance of the capacitor, and upper and lower cover layers 112 and 113 disposed on and below the active part as upper and lower margin parts, respectively.

The active part may be formed by repeatedly stacking the plurality of first and second internal electrodes 121 and 122 with at least one of the dielectric layers 111 interposed therebetween.

In this case, a thickness of the dielectric layer 111 may be suitably changed according to a capacitance design of the multilayer ceramic capacitor 100.

Further, the dielectric layer 111 may contain ceramic powder having high permittivity such as a barium titanate ($BaTiO_3$) based powder or a strontium titanate ($SrTiO_3$) based powder. However, a material of the dielectric layer 111 is not limited thereto.

The upper and lower cover layers 112 and 113 may have the same material and configuration as those of the dielectric layers 111 of the active part except that internal electrodes are not included therein.

The upper and lower cover layers 112 and 113 may be formed by stacking one or two or more dielectric layers on and below the active part in the thickness direction, respectively, and may generally serve to prevent the first and second internal electrodes 121 and 122 from being damaged by physical or chemical stress.

The first and second internal electrodes 121 and 122, which are electrodes having different polarities from each other, may be formed by printing a conductive paste containing a conductive metal on the dielectric layers 111 at a predetermined thickness.

In this case, the conductive metal contained in the conductive paste may be, for example, nickel (Ni), copper (Cu), palladium (Pd), or an alloy thereof. However, the conductive metal is not limited thereto.

Further, as a method of printing the conductive paste, a screen printing method, a gravure printing method, or the like, may be used. However, the printing method is not limited thereto.

The first and second internal electrodes 121 and 122 may be alternately stacked in the ceramic body 110 to face each other in the stacking direction of the dielectric layers 111.

The first and second internal electrodes 121 and 122 may be disposed to be alternately exposed to both end surfaces of the ceramic body 110 in the length direction, with each of the dielectric layers 111 interposed therebetween. In this case, the first and second internal electrodes 121 and 122 may be electrically insulated from each other by the dielectric layer 111 disposed therebetween.

Further, portions of the first and second internal electrodes 121 and 122 alternately exposed to opposite end surfaces of the ceramic body 110 in the length direction may physically contact first and second connection portions of first and second external electrodes 131 and 132 to be described below, respectively, and thus the first and second internal electrodes 121 and 122 may be electrically connected to the first and second external electrodes 131 and 132, respectively.

Therefore, when voltage is applied to the first and second external electrodes 131 and 132, electric charges are accumulated between the first and second internal electrodes 121 and 122 facing each other. In this case, capacitance of the multilayer ceramic capacitor 100 may be in proportion to an overlapping area between the first and second internal electrodes 121 and 122 overlapping each other in the active part.

Further, a thickness of the first and second internal electrodes 121 and 122 may be determined according to the use of the multilayer ceramic capacitor.

The first and second external electrodes 131 and 132 may be formed of a conductive paste containing a conductive metal. Here, the conductive metal may be, for example, nickel (Ni), copper (Cu), palladium (Pd), gold (Au) or an alloy thereof. However, the conductive metal is not limited thereto.

The first and second external electrodes 131 and 132 as described above may include first and second connection portions 131a and 132a and first and second band portions 131b and 132b.

In the first and second external electrodes 131 and 132, the first and second connection portions 131a and 132a may be disposed on opposite end surfaces of the ceramic body 110 in the length direction, respectively, and the first and second band portions 131b and 132b may be extended from the first and second connection portions 131a and 132a to portions of the lower surface, the mounting surface of the ceramic body 110.

Here, the first and second band portions 131b and 132b may be further extended up to at least one of portions of the upper surface of the ceramic body 110, opposite end surfaces thereof in the length direction, and opposite side surfaces thereof in the width direction.

Although a case in which the first and second band portions 131b and 132b of the first and second external electrodes 131 and 132 are extended from the first and second connection portions 131a and 132a to all of the portions of the upper surface of the ceramic body 110, opposite end surfaces thereof in the length direction, and opposite side surfaces thereof in the width direction to cover opposite end portions of the ceramic body 110 is described and illustrated in the present exemplary embodiment, the first and second band portions 131b and 132b are not limited thereto.

Further, since the first and second external electrodes 131 and 132 contain insulating resin layers containing conductive metal particles, the insulating resin layers as described above, formed by applying, for example, an insulating epoxy, or the like, may absorb external mechanical stress, or the like, thereby serving to prevent cracks, or the like, from occurring in the ceramic body 110 and the first and second internal electrodes 121 and 122.

The first and second metal terminals 220 and 230 may be coupled to opposite end surfaces of the insulation case 210 in the length direction and close opposite end portions of the open through holes 211, thereby serving to electrically connect the plurality of capacitor sets accommodated in the through holes 211 to each other in parallel.

The first metal terminal 220 may be coupled to one end surface of the insulation case 210 in the length direction.

Therefore, the first metal terminal 220 may contact a first external electrode 131 included in a multilayer ceramic capacitor 100 disposed at one distal end of the through hole 211 among the plurality of multilayer ceramic capacitors 100 connected in series, and having a first connection portion 131a exposed to the outside of the through hole 211, and thus the first metal terminal 220 may be electrically connected thereto.

Further, the first metal terminal 220 may include a first connection portion 221 disposed on one end surface of the insulation case 210 to serve to simultaneously close one end portions of the plurality of open through holes 211, a pair of first guide portions 222 and 223 extended from the first connection portion 221 to portions of the upper and lower surfaces of the insulation case 210, respectively, and a pair of first fixing portions 224 and 225 extended from the first connection portion 221 to portions of opposite side surfaces of the insulation case 210 in the width direction, respectively.

In this case, first fixing protrusions 224a and 225a, provided at opposite ends of the first fixing portions 224 and 225, may be inserted into the first fixing grooves 212 formed in opposite side surfaces of the insulation case 210 in the width direction, respectively.

The first fixing protrusions 224a and 225a may serve to prevent the first metal terminal 220 from being unexpectedly separated from the insulation case 210, for example, by elastic force of the compression spring 300, or the like.

The second metal terminal 230 may be coupled to the other end surface of the insulation case 210 in the length direction.

Therefore, the second metal terminal 230 may contact a second external electrode 132 included in a multilayer ceramic capacitor 100 disposed at the other distal end of the through hole 211 among the plurality of multilayer ceramic capacitors 100 connected in series and having a second connection portion 132a exposed to the outside of the through hole 211, and thus the second metal terminal 230 may be electrically connected thereto.

Further, the second metal terminal 230 may include a second connection portion 231 disposed on the other end surface of the insulation case 210 to serve to simultaneously close the other end portions of the plurality of open through holes 211, a pair of second guide portions 232 and 233 extended from the second connection portion 231 to portions of the upper and lower surfaces of the insulation case 210, respectively, and a pair of second fixing portions 234 and 235 extended from the second connection portion 231 to portions of opposite side surfaces of the insulation case 210 in the width direction, respectively.

In this case, second fixing protrusions 234a and 235a, provided at opposite ends of the second fixing portions 234 and 235, may be inserted into the second fixing grooves 213 formed in both side surfaces of the insulation case 210 in the width direction, respectively.

The second fixing protrusions 234a and 235a may serve to prevent the second metal terminal 230 from being unexpectedly separated from the insulation case 210, for example, by elastic force of the compression spring 300, or the like.

The first and second metal terminals 220 and 230 thus may secure the plurality of multilayer ceramic capacitors 100 accommodated in the insulation case 210. In the multilayer ceramic electronic component, according to the present exemplary embodiment configured as described above, external mechanical stress may be absorbed and decreased by the first and second metal terminals 220 and 230 and the elasticity of the compression spring 300, and thus the multilayer ceramic electronic component may prevent mechanical stress from being transferred to the plurality of multilayer ceramic capacitors 100, thereby preventing damage of the multilayer ceramic capacitors 100 in advance.

In addition, since a product may be assembled without using solder or a conductive adhesive, heat treatment may be omitted in a manufacturing process, and thus manufacturing costs may be decreased, and thermal stress applied to the electronic component may be decreased, and thus a yield or quality of the product may be improved.

Modified Exemplary Embodiment

Figure 5:
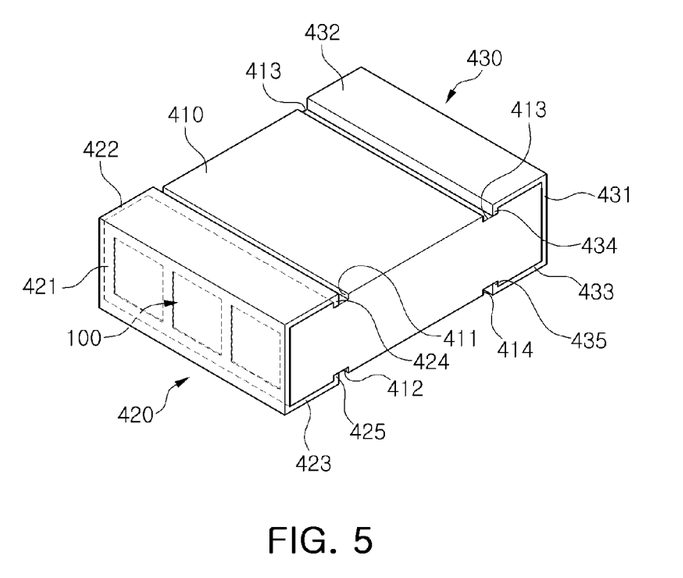
FIG. 5 is a perspective view schematically illustrating a multilayer ceramic electronic component according to another exemplary embodiment in the present disclosure.

FIG. 5 is a perspective view schematically illustrating a multilayer ceramic electronic component according to another exemplary embodiment.

Here, a detailed description of the same structure and function as those in the exemplary embodiment described above will be omitted, and only metal terminals and an insulation case having a different structure will be described.

Referring to FIG. 5, a first metal terminal 420 may include a first connection portion 421 disposed on one end surface of an insulation case 410 to close one end portions of a plurality of open through holes 415, a pair of first guide portions 422 and 423 extended from the first connection portion 421 to portions of upper and lower surfaces of the insulation case 410, respectively, and a pair of first linear protrusions 424 and 425 extending in a width direction to protrude inwardly from distal ends of the first guide portions 422 and 423.

In this case, first slits 411 and 412 may be formed to be extended in the width direction in the upper and lower surfaces of the insulation case 410, respectively, so that the first linear protrusions 424 and 425 may be insertedly coupled thereinto.

Therefore, the first metal terminal 420 may be coupled to one end surface of the insulation case 410 in a state in which upper and lower first linear protrusions 424 and 425 are inserted into the upper and lower first slits 411 and 412, respectively, and thus the upper and lower first linear protrusions 424 and 425 may serve to prevent the first metal terminal 420 from being unexpectedly separated from the insulation case 410 by elastic force of a compression spring 300, or the like.

Further, in the first metal terminal 420, grooves may be formed in the first guide portions 422 and 423. These grooves formed in the first guide portions 422 and 423 may decrease a volume of the first metal terminal 420 to decrease rigidity, thereby allowing elastic deformation to more easily occur when vibrations or external forces such as mechanical stress are transferred. Therefore, the grooves may increase an effect of absorbing external force, thereby improving an effect of protecting the multilayer ceramic capacitor from external force.

A second metal terminal 430 may include a second connection portion 431 disposed on the other end surface of the insulation case 410 to close the other end portions of the plurality of open through holes, a pair of second guide portions 432 and 433 extended from the second connection portion 431 to portions of the upper and lower surfaces of the insulation case 410, respectively, and a pair of second linear protrusions 434 and 435 formed in the width direction to protrude inwardly from distal ends of the second guide portions 432 and 433.

In this case, second slits 413 and 414 may be formed to be extended in the width direction in the upper and lower surfaces of the insulation case 410, respectively, so that the second linear protrusions 434 and 435 may be insertedly coupled thereinto.

Therefore, the second metal terminal 430 may be coupled to the other end surface of the insulation case 410 in a state in which upper and lower second linear protrusions 434 and 435 are inserted into the upper and lower second slits 413 and 414, respectively, and thus the upper and lower second linear protrusions 434 and 435 may serve to prevent the second metal terminal 430 from being unexpectedly separated from the insulation case 410 by elastic force of the compression spring 300, or the like.

Further, in the second metal terminal 430, grooves may be formed in the second guide portions 432 and 433. These grooves formed in the second guide portions 432 and 433 may decrease a volume of the second metal terminal 430 to decrease rigidity, thereby allowing elastic deformation to more easily occur when vibrations or external forces such as mechanical stress are transferred. Therefore, the grooves may increase the effect of absorbing external force, thereby improving the effect of protecting the multilayer ceramic capacitor from external force.

In a case in which the first and second metal terminals 420 and 430 and the insulation case 410 are coupled to each other by the first and second linear protrusions and the first and second slits as in the present exemplary embodiment, areas of the first and second metal terminals 420 and 430 fixed to the insulation case 410 may be increased, and thus adhesive force between the first and second metal terminals 420 and 430 and the insulation case 410 may be improved.

Figure 6:
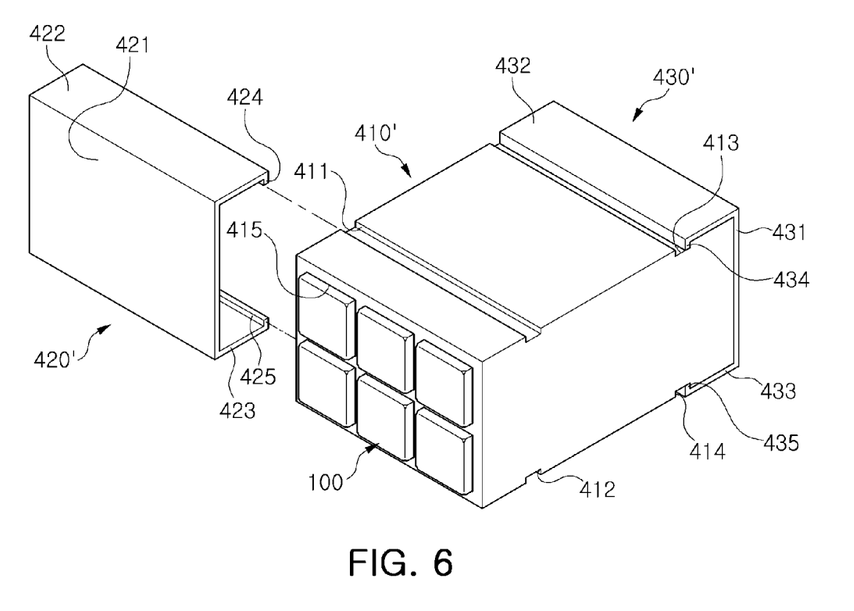
FIG. 6 is an exploded perspective view of a first metal terminal and a case of a multilayer ceramic electronic component according to another exemplary embodiment in the present disclosure.

FIG. 6 is an exploded perspective view of a first metal terminal and a case of a multilayer ceramic electronic component according to another exemplary embodiment.

FIG. 6 illustrates a case in which the through holes 415 are configured in two rows by increasing a height of an insulation case 410' in order to increase the number of multilayer ceramic capacitors 100 accommodated in the multilayer ceramic electronic component of FIG. 5. Since the multilayer ceramic electronic component of FIG. 6 is the same as that of the exemplary embodiment described above except that heights of first and second metal terminals 420' and 430' are increased in accordance with the increased height, a detailed description thereof will be omitted.

As set forth above, according to exemplary embodiments, external mechanical stress may be absorbed and decreased by the metal terminals and elasticity of the compression spring, and thus damage to the multilayer ceramic capacitor may be prevented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a capacitor set including a plurality of multilayer ceramic capacitors connected in series, and accommodated in an insulation case while exposing external electrodes provided on opposite end portions thereof; and
   a pair of metal terminals connected to the external electrodes exposed outside of the insulation case, respectively,
   wherein one end portion of the capacitor set is elastically supported by one of the pair of metal terminals,
   wherein each of the pair of metal terminals is disposed on first and second opposing surfaces of the insulation case, and
   wherein at least two capacitor sets are accommodated in the insulation case while being spaced apart from each other and being parallel to or perpendicular to each other.

2. The multilayer ceramic electronic component of claim 1, wherein the insulation case has at least one through hole in which the capacitor set is accommodated.

3. The multilayer ceramic electronic component of claim 1, wherein each of the metal terminals includes:
a guide portion supporting upper and lower surfaces of the insulation case; and
a fixing portion fixed to a surface of the insulation case.

4. The multilayer ceramic electronic component of claim 3, wherein an end of the fixing portion of each metal terminal has a fixing protrusion, and
the surface of the insulation case has a fixing groove corresponding to the fixing protrusion.

5. The multilayer ceramic electronic component of claim 1, wherein at least one of the pair of metal terminals is disposed on third and fourth opposing surfaces of the insulation case.

6. A multilayer ceramic electronic component comprising:
an insulation case including a plurality of through holes arranged in parallel;
a plurality of multilayer ceramic capacitors having external electrodes provided on opposite ends thereof, at least two thereof being connected in series and accommodated in one of the plurality of through holes;
first and second metal terminals coupled to the insulation case to close end portions of the through holes; and
an elastic support member disposed between the first or second metal terminal and the multilayer ceramic capacitors,
wherein each of the first and second metal terminals is disposed on first and second opposing surfaces of the insulation case.

7. The multilayer ceramic electronic component of claim 6, wherein at least two through holes are provided in the insulation case to be spaced apart from each other in a width or height direction of the insulation case.

8. The multilayer ceramic electronic component of claim 6, wherein the first and second metal terminals include:
first and second connection portions closing the end portions of the through holes, respectively;
first and second guide portions extended from the first and second connection portions to portions of upper and lower surfaces of the insulation case, respectively; and
first and second fixing portions extended from the first and second connection portions to portions of opposite side surfaces of the insulation case, respectively, and including first and second fixing protrusions provided at ends thereof, and
the insulation case includes first and second fixing grooves provided in the opposite side surfaces thereof, the first and second fixing grooves corresponding to the first and second fixing protrusions, respectively.

9. The multilayer ceramic electronic component of claim 6, wherein the first and second metal terminals include:
first and second connection portions closing opposite end portions of the through holes, respectively;
first and second guide portions extended from the first and second connection portions to portions of upper and lower surfaces of the insulation case, respectively; and
first and second linear protrusions provided at ends of the first and second guide portions, and
the insulation case includes first and second slits provided in the upper and lower surfaces thereof so that the first and second linear protrusions are insertedly coupled thereinto.

10. The multilayer ceramic electronic component of claim 6, wherein the elastic support member is a compression spring.

11. The multilayer ceramic electronic component of claim 6, wherein at least one of the first and second metal terminals is disposed on third and fourth opposing surfaces of the insulation case.

12. A multilayer ceramic electronic component comprising:
an insulation case including a plurality of holes penetrating through opposite ends of the insulation case;
a plurality of multilayer ceramic capacitors disposed in the plurality of holes of the insulation case; and
first and second metal terminals disposed at the opposite ends of the insulation case and electrically connected to the multilayer ceramic capacitors that are disposed at distal ends of the plurality of holes,
wherein each of the first and second metal terminals is disposed on first and second opposing surfaces of the insulation case.

13. The multilayer ceramic electronic component of claim 12, wherein each of the first and second metal terminals are electrically connected to the multilayer ceramic capacitors that are disposed at distal ends of the plurality of holes via a plurality of elastic support members disposed therebetween.

14. The multilayer ceramic electronic component of claim 12, wherein all the ceramic capacitors disposed in a same hole are connected to each other in series.

15. The multilayer ceramic electronic component of claim 12, wherein the insulation case includes recesses formed on exterior surfaces of the insulation case, and each of the first and second metal terminals includes a protrusion inserted into a respective recess of the insulation case.

16. The multilayer ceramic electronic component of claim 12, wherein a sum of lengths of all the ceramic capacitors disposed in a same hole is greater than a length of the same hole.

17. The multilayer ceramic electronic component of claim 12, wherein at least one of the first and second metal terminals is disposed on third and fourth opposing surfaces of the insulation case.

18. A multilayer ceramic electronic component comprising:
an insulation case including a plurality of through holes arranged in parallel;
a plurality of multilayer ceramic capacitors having external electrodes provided on opposite ends thereof, at least two thereof being connected in series and accommodated in one of the plurality of through holes;
first and second metal terminals coupled to the insulation case to close end portions of the through holes; and
an elastic support member disposed between the first or second metal terminal and the multilayer ceramic capacitors,
wherein the first and second metal terminals include:
first and second connection portions closing the end portions of the through holes, respectively;
first and second guide portions extended from the first and second connection portions to portions of upper and lower surfaces of the insulation case, respectively; and
first and second fixing portions extended from the first and second connection portions to portions of opposite side surfaces of the insulation case, respectively, and including first and second fixing protrusions provided at ends thereof, and the insulation case includes first and second fixing grooves provided in the opposite side surfaces thereof, the first and second fixing grooves corresponding to the first and second fixing protrusions, respectively.

19. A multilayer ceramic electronic component comprising:
- an insulation case including a plurality of through holes arranged in parallel;
- a plurality of multilayer ceramic capacitors having external electrodes provided on opposite ends thereof, at least two thereof being connected in series and accommodated in one of the plurality of through holes;
- first and second metal terminals coupled to the insulation case to close end portions of the through holes; and
- an elastic support member disposed between the first or second metal terminal and the multilayer ceramic capacitors,
- wherein the first and second metal terminals include:
- first and second connection portions closing opposite end portions of the through holes, respectively;
- first and second guide portions extended from the first and second connection portions to portions of upper and lower surfaces of the insulation case, respectively; and
- first and second linear protrusions provided at ends of the first and second guide portions, and
- the insulation case includes first and second slits provided in the upper and lower surfaces thereof so that the first and second linear protrusions are insertedly coupled thereinto.

\* \* \* \* \*